(12) United States Patent
Skelhorn et al.

(10) Patent No.: US 6,323,269 B1
(45) Date of Patent: Nov. 27, 2001

(54) MINERAL CONTAINING THERMOPLASTIC GRANULES

(75) Inventors: David A. Skelhorn, Alpharetta; Allison R Calhoun, Sandersville, both of GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 09/066,275

(22) Filed: Apr. 24, 1998

Related U.S. Application Data

(63) Continuation-in-part of application No. 08/988,757, filed on Dec. 11, 1997, now abandoned, which is a continuation of application No. 08/171,534, filed on Dec. 22, 1993, now abandoned, which is a continuation-in-part of application No. 08/639,309, filed on Apr. 25, 1996, now Pat. No. 5,744,530.

(60) Provisional application No. 60/070,808, filed on Jan. 8, 1998, and provisional application No. 60/068,992, filed on Dec. 29, 1997.

(51) Int. Cl.⁷ .................. C08J 5/10; C08K 3/26; C08L 23/10
(52) U.S. Cl. ............. 524/425; 524/447; 524/449; 524/451; 523/210; 523/211; 521/79; 521/90; 521/92; 521/98
(58) Field of Search ................... 524/425, 447, 524/437, 449, 445, 448, 451; 523/210, 211; 521/98, 92, 90, 79

(56) References Cited

U.S. PATENT DOCUMENTS

| | | | |
|---|---|---|---|
| 3,812,225 | * 5/1974 | Hosoda et al. | 264/54 |
| 4,643,940 | * 2/1987 | Shaw et al. | 428/308.4 |
| 4,680,318 | * 7/1987 | Fujii et al. | 521/95 |
| 4,803,231 | 2/1989 | Seinera et al. | 523/219 |
| 4,898,620 | 2/1990 | Rayfield et al. | 106/464 |
| 5,744,530 | 4/1998 | Skelhorn | 524/427 |

FOREIGN PATENT DOCUMENTS

| | | |
|---|---|---|
| 2016447 | * 5/1990 | (CA) . |
| 0 355 808 | 2/1999 | (EP) . |

OTHER PUBLICATIONS

D. R. Dinger et al., "Particle Packing –ll –Review of Packing of Polydisperse Particle Systems", *Intercerem* 41, No. 3 (1992), 176–179.

Abstract of Ling, Wei, "Feasibility on producing high–content filled masterbatch using the twinscrew extruder", Suliao (1991), 20(4), 35–9, *Chemical Abstracts* AN 1992:409309.

Abstract of Mitsuishi, Kazuta, et al., "high–loading effect of surface–modified inorganic particles in polymer materials", J. Mater. Sci. Lett. (1989), 8(6), 624–6, *Chemical Abstracts* AN 1989:516163.

Abstract of Schlumpf, Hans Peter, et al., "Fatty amide–metal soap coatings for inorganic fillers or fireproofing agents", Ger. Offen., 11 pp., EP 0 355 808, *Chemical Abstracts* AN 1990:460661.

Abstract of Tsukizaka, Ryogo et al., "Polypropylene Composition", Japan Patent No. JP 49024136, published June 20, 1974, *Chemical Abstracts* AN 1975:73958.

* cited by examiner

Primary Examiner—Samuel A. Acquah
Assistant Examiner—U. K. Rajguru
(74) Attorney, Agent, or Firm—Finnegan, Henderson, Farabow, Garrett, and Dunner, L.L.P.

(57) ABSTRACT

A mineral containing thermoplastic granule for incorporation in a thermoplastic material to produce a thermoplastic end product, the granule comprising at least 50% by weight of an inorganic particulate material, at least 0.1% by weight of an additive comprising a blowing agent, and the balance comprising a thermoplastic binder.

15 Claims, No Drawings

MINERAL CONTAINING THERMOPLASTIC GRANULES

RELATED APPLICATIONS

This Application is a continuation-in-part of U.S. patent application Ser. No. 08/639,309, filed on Apr. 25, 1996, now U.S. Pat. No. 5,744,503, which is a continuation of U.S. patent application Ser. No. 08/171,543, filed Dec. 22, 1993, abandoned. This Application is also a continuation-in-part of U.S. patent application Ser. No. 08/988,757 filed Dec. 11, 1997. This application claims the benefits of U.S. Provisional Application No. 60/068,992, filed Dec. 29, 1997 and of U.S. Provisional Application No. 60/070,808, filed Jan. 8, 1998.

BACKGROUND OF THE INVENTION

1. Field of the Invention

This invention relates to mineral containing thermoplastic granules and their production and use especially in the production of thermoplastic end products.

2. Brief Description of the Prior Art

It is well known in the production of thermoplastic materials and articles produced from such materials, eg by mixing or compounding followed by a shaping process such as molding, extrusion or blowing, to incorporate in the material an additive known as a blowing agent which when the material is heated and/or compressed during processing causes release of a gas into the material. Foamed lightweight materials may be produced thereby. In the prior art, the blowing agent is incorporated as a separate ingredient in the composition to be mixed or compounded together with the other ingredients to be included in the composition. Extensive mixing of the blowing agent with the other ingredients and the base thermoplastic, ie the thermoplastic material which will provide the matrix in the end product, is required in the compounding stage to ensure that these ingredients are fully and homogeneously mixed throughout the material to be formed.

It is an object of the present invention to provide an improved, more convenient way of introducing a blowing agent into a thermoplastic material.

It is also an object of the present invention to provide an improved method of nucleating gas release from a blowing agent in a thermoplastic material.

It is also an object of the present invention to provide a new granule form suitable for providing a carrier medium for introducing a blowing agent into a thermoplastic material.

These and other objects which will become apparent are met by the present invention.

SUMMARY OF THE INVENTION

According to the present invention in a first aspect there is provided a mineral-containing thermoplastic granule for incorporation in a thermoplastic material to produce a thermoplastic end product, the granule comprising at least 50% by weight of an inorganic particulate material, at least 0.1% by weight of an additive comprising a blowing agent, and the balance comprising a thermoplastic binder.

According to the present invention in a second aspect there is provided a method of producing a foamed thermoplastic material which includes the steps of (a) adding to a base thermoplastic material a plurality of granules each comprising at least 50% by weight of an inorganic particulate material, at least 0.1% by weight of an additive comprising a blowing agent the balance being a thermoplastic binder; (b) mixing or compounding the granules with the base thermoplastic material to form a modified thermoplastic material; and (c) shaping the modified thermoplastic material to produce an end product, wherein in either step (b) or step (c) or heat is applied which causes gas from the blowing agent to be released to produce foaming in the modified thermoplastic material.

Preferably the inorganic particulate material forms at least 50% by weight, eg from 50% to 91%, by weight of the granules on a dry weight basis. Preferably, the blowing agent forms at least 1% by weight, eg from 1.0% to 42% by weight of the granules. The thermoplastic binder may form from 8% to 20%, especially from 8% to 15% by weight of the granules.

The non-binder ingredients of the granules may form from 85% to 95%, eg from 85% to 92% by weight of the granules, the thermoplastic binder forming the balance. The non-binder ingredients of the granules, namely inorganic particulate material and blowing agent, may be present in the granules in a weight ratio in the range of from about 1:99 to about 99:1.

By incorporating the blowing agent in the granule according to the first aspect of the invention and by incorporation of a multiplicity of such granules in a thermoplastic composition to produce an end product by compounding and shaping, the procurement and delivery of ingredients to be employed in the thermoplastic composition is simplified and the mixing and compounding of ingredients may be carried out more easily with reduced energy and at lower cost.

In addition, the use of granules in accordance with the first aspect of the invention beneficially acts as a nucleating agent for the release of gas from the blowing agent and thereby provides a network of particles which nucleate the foaming process producing a larger number of fine pores compared with the smaller number of large pores obtained when no mineral is added. Pores have been determined to be typically 0.2 mm to 0.4 mm in size where the inorganic particulate material is added together with the blowing agent compared with typically 0.6 mm to 1.5 mm where the blowing agent is used alone.

DESCRIPTION OF THE INVENTION

In the granule according to the first aspect of the present invention the blowing agent may comprise one of the known blowing or gas generating agents employed in the prior art to produce foaming during heating in a thermoplastic material being processed. The gas produced may for example comprise nitrogen, carbon dioxide or one or more optionally halogenated hydrocarbons. The blowing agent may be selected to produce gas at a given temperature and/or pressure. Examples of blowing agents include triazoles, tetrazoles, dialkyldicarbonates, carbonamides, eg azodicarbonamide, dicyclohexamine, cyclic aminoethers, sulfur hexafluoride, halocarbons, morpholines, cyclopentadiene, polycarboxylates, sodium aluminum hydroxy carbonate and citric acid derivatives, eg hydrocerol. Other blowing agents may also be used. These may be used alone, in blends, or in combination with injection of an inert gas such as nitrogen, carbon dioxide or other gas or gas generating material. Other additives, eg stabilizers, molecular traps, catalysts, etc. may be included as part of the blowing agent composition to facilitate gas generation from the blowing agent chemical.

Other optional additives normally incorporated in a thermoplastic composition, eg as additives to the inorganic material or other components employed therein may be included in the granule according to the first aspect of the invention, eg up to 10% by weight based on the weight of the inorganic particulate material.

Use of granules which comprise an inorganic particulate material, eg calcium carbonate, together with a polymeric thermoplastic binder, for incorporation in a base thermoplastic composition to produce a filled, thermoplastic end product is known, eg from CA-A-2,016,447, and improvements to such granules are described in WO95/17441 which corresponds to the parent U.S. Application from which the present U.S. Application is derived. The present invention takes advantage of such granules as a convenient carrier medium for uniformly adding the blowing agent to the base thermoplastic composition and acting as a nucleation agent for bubble formation in the base composition in a controlled, uniform manner.

In the thermoplastic granule according to the first aspect of the present invention the inorganic particulate material may comprise any one or more of the materials well known for use as fillers or extenders in plastics material. For example, it may comprise a white inorganic particulate pigment or filler selected from alkaline earth metal carbonates, especially calcium carbonate, kaolin, calcined kaolin, wollastonite, bauxite, talc and mica. The inorganic particulate material may contain a minor amount, eg up to 10% by weight (based on the weight of the inorganic particulate material), of a coating material or additive, which is known to facilitate intimate mixing and contacting of the inorganic material with plastics materials, in this case the binder of the granule, eg a latex or a surface treatment coating such as a fatty acid or derivative thereof. Desirably, although not essentially, the inorganic particulate material comprises an alkaline earth metal carbonate, eg calcium carbonate, magnesium carbonate, calcium magnesium carbonate or barium carbonate. Such a carbonate may be obtained from a natural source, eg marble, chalk, limestone or dolomite, or may be prepared synthetically, eg by reaction of carbon dioxide with an alkaline earth metal hydroxide, eg calcium hydroxide, or may be a combination of the two, ie naturally derived and synthetic material. Desirably, at least 95%, preferably at least 99%, by weight of the inorganic particulate material comprises alkaline earth metal carbonate. At least 95% to 99% by weight may be calcium carbonate which may be obtained in a well known way by processing naturally occurring calcium carbonate obtained from a mineral source or by chemical synthesis, eg from carbon dioxide and lime.

Where the inorganic particulate material has been obtained from a natural mineral source it may have been processed eg by known purification and comminution procedures to have a suitable form prior to use in the granule. For example where the material comprises calcium carbonate at least 30%, desirably at least 40%, by weight of the particles of the material may have a size (equivalent spherical diameter as measured by sedimentation) of less than 10 $\mu$m, eg at least 40% by weight may be less than 7$\mu$m, especially less than 5 $\mu$m.

Desirably, the inorganic particulate material, especially where an alkaline earth metal carbonate, is treated with a hydrophobizing surface treatment agent prior to use in the production of the granules.

Use of surface treatment agents, which, when the inorganic particulate material is dry, facilitate dispersion of the inorganic particulate material in hydrophobic polymeric material are well known.

Suitable surface treatment agents include carboxylic acids and salts and esters thereof, especially fatty acids having from 10 to 24 carbon atoms in their chain, eg stearic acid, behenic acid, montanic acid and mixtures thereof, and coupling agents, eg organosilanes, organotitanates and zircoaluminates.

The amount of surface treatment agent present may be up to 2% by weight based on the dry weight of the inorganic particulate material present.

The term "granule" as used herein is intended to refer to the individual discrete components which in total comprise a particulate which as such is in use blended with the aforementioned base thermoplastic. These discrete components can have irregular surface characteristics as commonly results from granulation, or can have smooth continuous surfaces as a result of pelletization. Both of these discrete types of assemblages are intended to be encompassed herein by the term "granule".

In order to maximize the particle packing characteristics in the granule according to the first aspect, the particle size distribution (psd) of the carbonate and blowing agent incorporated into the granule is preferably in accordance with the equation:

Cumulative per cent finer than $$D = \frac{(D^n - D_S^n)}{D_L^n - D_S^n} \times 100\% \qquad \text{Equation (1)}$$

where D=Particle size
D=Smallest particle size—selected
DL=Largest particle size—selected
N=Distribution modulus;

$D_L$ should be in the range of 100 to 1.0 $\mu$m; $D_S$ in the range of 10 to 0.01 $\mu$m; and n is accorded a value appropriate for particles assumed to be approximately spherical. Preferably $D_L$ is in the range of 44 to 2 $\mu$m, $D_S$ is in the range of 0.5 to 0.1 $\mu$m, and n is about 0.37. The carbonate used in the pellet may be an alkaline earth metal carbonate, such as a calcium carbonate, dolomite, magnesite or strontium carbonate, and is preferably a ground or chemically precipitated calcium carbonate, or a mixture of ground and precipitated calcium carbonates. In many applications a ground marble is found to be particularly advantageous.

The method of producing desired particle sizes may be by comminution of naturally occurring carbonate minerals by a dry or a wet process, or by precipitation from an aqueous medium. They may be produced by blending of components each having a different psd or from a production process which generates them naturally.

The thermoplastic granules of the invention are typically in the size range of from 1 mm to 10 mm, preferably from 2 mm to 4 mm, and the base thermoplastic with which the granules are to be blended to produce an end product may comprise granules in the same size range.

The invention does not require the use of additional chemical materials for the purpose of preparation of the granules according to the first aspect or of re-dispersion of the granules in a thermoplastic composition, and thus the granules of the invention are preferably substantially free of a dispersing or fluidifacient additive. The granules may, however, include any additional functional additives which may be desired in the final thermoplastic formulation.

Binders for use in the granules according to the first aspect of the invention, preferably comprise an amorphous polyolefin or a highly branched polyethylene wax. Typical binders of these kinds are polypropylene homopolymers and amorphous copolymers of propylene and ethylene or butylene. It should be appreciated that such binders of granules according to the invention differ markedly from conventional prior art binders used in pellets of mineral concentrates. These conventional binders are typically polyolefins and polyolefin waxes, which are thereby highly comparable with polyolefin polymers.

The binders for the granules according to the invention should be chemically and physically compatible with the base or matrix thermoplastic to be used to produce the resulting end product so that the end product is not significantly weakened or discolored by the presence of the binder, and does not exhibit surface bloom from migration of the granule binder to the product surface.

Among the amorphous polyolefins utilizable as binders in the granules of the invention are amorphous polypropylene homopolymers. These differ from conventional polypropylenes which are highly crystalline.

Amorphous copolymers of propylene and ethylene, and mixtures of copolymer with homopolymer are also effective for use in the granules according to the first aspect of the invention.

Highly branched polyethylene waxes suitable for use in the granules according to the first aspect of the invention include preferably saturated, non-polar, synthetic hydrocarbon waxes which have been chemically neutralized. The special HULS/VEBA modification of the Ziegler low pressure polymerization of ethylene is typically used to produce the unique characteristics of this group of materials. The process confers branched-chain isoparrafinic configurations.

The granules according to the first aspect of the invention may be prepared in a known manner, eg by mixing and kneading the inorganic particulate material, the blowing agent, other optional additives and the binder for the granules in a heated mixer or compounder, which is part of a batch or continuous compounding machine. The resultant homogeneous mixture, eg in the form of one or more elongate extrudate portions, may be formed into granules by passing the mixture into a pelletizer or granulator. The resultant granules may be sized, eg by passing the granules through appropriately sized sieves or screens, eg to produce granule sizes in the range 2 mm to 4 mm.

The polymeric material employed to produce the end product by incorporation therein of the granules may be of any of the kinds of hydrophobic (substantially water insoluble) polymeric materials in which inorganic particulate materials are known to be incorporated, eg as filler or extender materials. Such material may comprise for example a continuous polymer matrix when the filler is added therein, eg a shaped article. Such materials may be employed in a variety of applications, eg as molded plastics products, elastomers, rubbers or sealants.

The granules according to the first aspect of the invention may be incorporated directly into a body of a base polymeric material to form a product by one of the suitable product forming processes well known in the art.

Examples of base thermoplastic materials into which granules according to the first aspect of the invention may be incorporated to produce a foamed product include polyolefin homopolymers or copolymers (eg low density or high density polyethylenes, linear polyethylenes, polypropylenes, ethylene-propylene copolymers, ethylene (vinyl acetate) copolymers, and ethylene-(acrylic acid) copolymers, halogenated polyethylenes (such as chlorinated polyethylene), polybutene, polymethylbutene, polyisobutylene, polystyrenes and polystyrene derivatives (eg SB, ABS, SA and SBS rubbers), PVCs, and blends, mixtures or copolymers containing these species.

We have found that the granules according to the invention are particularly suitable for incorporation into polyethylene or polypropylene homo-or co-polymers.

Where the material to be formed into an end product comprises a thermoplastic material the product forming process employed to form a product from the thermoplastic material and the granules added thereto may be one of the methods well known in the art. Examples include melt compounding followed by extrusion of films, tubes, shapes, strips and coatings onto other materials, eg paper, metal sheet, foil, injection molding, blow molding, structural foam molding, casting and thermoforming. The melt compounding may for example be carried out in a suitable compounder or screw extruder. The thermoplastic material to be compounded may suitably be in a granular or pelletised form. The temperature of the compounding and moulding, shaping or extrusion processes will depend upon the thermoplastic material being processed and materials incorporated therein as well as the temperature required to nucleate gas generation from the blowing agent. The temperature will be above the softening point of the thermoplastic material.

The thermoplastic material in which the granules are dispersed may include other additives well known to those familiar in the art, eg processing agents, such as lubricants, thermal or photochemical stabilising agents, colouring agents, plasticizers, antistatic agents, fire retardants, antioxidants, metal passivating agents or other reinforcing or filling agents such as natural or artificial fibres, metal particles, strands or foils, glass beads or microspheres and the like or other mineral (inorganic) fillers.

It may be formed into products either alone or together with other materials such as plastics, metals, refractories, wood, paper etc. in the form of laminates, coatings and the like.

DESCRIPTION OF ILLUSTRATIVE EMBODIMENTS OF THE INVENTION

Embodiments of the present invention will now be described by way of example only with reference to the following Example.

EXAMPLE 1

A refined particulate calcium carbonate was produced from ground marble and had the following approximate particle size properties.

$D_L$=18 µm and N=0.3

$D_S$=0.35 µm, where $D_L$, $D_S$ and N are as defined by Equation (1) earlier.

The carbonate was treated with 0.5% to 0.6% by weight of stearic acid and was employed in the production of a granule embodying the first aspect of the present invention in the following manner.

64.35g of an amorphous polyolefin wax was added to a two roll mill and was allowed to melt by heating at 150° C. in the mill. 425 g of the stearic acid coated carbonate was added and the carbonate and melted wax were well mixed. 10.65 g of a yellow, azodicarbonamide blowing agent commercially available under the trade name Celogen AZ-199 was added to the mixed material on the mill.

The material was pulled off the mill when the yellow blowing agent was dispersed throughout the material as determined by visual inspection. The material was then broken up by hammering or cutting with scissors. The sample was screened through a 5 and 10 mesh screen.

Anything retained between these two screens was used to compound with a high density polyethylene, "12MI HDPE", the base thermoplastic material to be formed into an end product.

470.6 g of the granules comprising carbonate, blowing agent and amorphous polyolefin wax were mixed in a compounder with the 12MI HDPE to produce a composition containing 20% by weight calcium carbonate, 0.5% by weight blowing agent, the balance being essentially thermoplastic material. This mixture was used as a feed to an injection molder. The temperature profile within the molder was as follows.

| | |
|---|---|
| Zone 4 (nozzle) | 222° C. |
| Zone 3 | 215° C. |
| Zone 2 | 208° C. |
| Zone 1 (hopper) | 192° C. |

The product samples obtained were inspected for a loss in color which indicates that the blowing agent decomposed and for the presence of a foam structure.

The mechanism for the degradation of the blowing agent is controlled by an equilibrium condition defined by the temperature. The decomposition is mediated by the pressure the melt is exposed to because the decomposition of the material produces a gas. High pressures stop the reaction. Because of this, a check valve at the nozzle was required to reduce the pressure in the mold cavities. Ideally, injection molding should be performed with a high injection pressure and speed to get the material into the cavity quickly. Also, a small shot size should be used to allow room in the mold for the material to expand while foaming occurs. Once the material is introduced to the mold, the check valve should close allowing the pressure to reduce. The pressures were low enough to allow near complete decomposition of the azodicarbonamide blowing agent producing $CO_2$, $CO$, $N_2$ and $NH_3$, SEM photographs were taken of these products and showed a suitable foam structure.

What we claim is:

1. A mineral-containing thermoplastic granule for incorporation in a thermoplastic material to produce a thermoplastic end product, the granule comprising 85% to 92% by weight of an inorganic particulate material having a particle size distribution in accordance with the equation:

$$\text{cumulative percent finer than } D = (D^n - D_S^n)/(D_1^n - D_S^n) \cdot 100$$

where D=particle size, $D_S$=smallest particle size and is in the range of 10 to 0.1 μm, $D_1$=largest particle size and is in the range of 100 to 1.0 μm, and n=distribution modulus and has a value appropriate for carbonate particles assumed to be approximately spherical, at least 0.1% by weight of an additive comprising a blowing agent, and the balance comprising a thermoplastic binder.

2. A mineral-containing thermoplastic granule for incorporation in a thermoplastic material to produce a thermoplastic end product, the granule comprising at least 50% by weight of an inorganic particulate material at least 0.1% by weight of an additive comprising a blowing agent, and the balance comprising a thermoplastic binder.

3. A mineral-containing thermoplastic granule for incorporation in a thermoplastic material to produce a thermoplastic end product, the granule comprising 85% to 92% by weight of an inorganic particulate material, at least 0.1% by weight of an additive comprising a blowing agent, wherein the granule has a very high density such that the blowing agent and inorganic particulate material are in intimate proximity.

4. A method of producing a thermoplastic end product wherein a mineral-containing thermoplastic granule is added to a thermoplastic material to produce the thermoplastic end product having pores most of which are about 0.2 to about 0.4 millimeters, wherein the granule comprises 85% to 92% by weight of an inorganic particulate material, at least 0.1% by weight of an additive comprising a blowing agent, and the blowing agent and inorganic particulate material are in intimate proximity.

5. A granule as claimed in claim 1 wherein the inorganic particulate material and the blowing agent are present in the granule in a combined amount of from 85% to 95% by weight.

6. A granule as claimed in claim 5 or 2 wherein the blowing agent forms at least 1% by weight of the granule.

7. A granule as claimed in claim 1 or 2 wherein the inorganic particulate material is alkaline earth metal carbonates, kaolin, calcined kaloin, wollastonite, bauxite, talc or mica.

8. A granule as claimed in claim 7 wherein at least 95% by weight of the inorganic particulate material comprises alkaline earth metal carbonate.

9. A granule as claimed in claim 8 wherein the inorganic particulate material has been treated with a hydrophobizing surface treatment agent.

10. A granule as claimed in claim 1 or 2 wherein the blowing agent is chosen from triazoles, tetrazoles, dialkyldicarbonates, carbonamides, dicyclohexamine, cyclic aminoethers, sulfur hexafluoride, halocarbons, morpholines, cyctopentadiene, polycarboxylates, sodium aluminum hydroxy carbonate, and citric acid derivatives used alone, in blends or in combination with injection of inert gas.

11. The mineral-containing thermoplastic granule according to claim 2, wherein the inorganic particulate material and the blowing agent are present in the granule in a combined amount of from 85% to 95% by weight.

12. A method of producing a foamed thermoplastic material which includes (a) adding to a base thermoplastic material a plurality of granules each comprising at least 50% by weight of an inorganic particulate material, at least 0.1% by weight of an additive comprising a blowing agent, the balance being a thermoplastic binder; (b) mixing or compounding the granules with the base thermoplastic material to form a modified thermoplastic material; and (c) shaping the modified thermoplastic material to produce an end product, wherein in either step (b) or step (c) heat is applied which causes gas from the blowing agent to be released to produce foaming in the modified thermoplastic material.

13. A granule as claimed in claim 2 wherein the inorganic particulate material forms at least 80% by weight of the granule.

14. A granule as claimed in claim 2 wherein the thermoplastic binder forms from 8% to 20% by weight of the granule.

15. A granule as claimed in claim 10 wherein the inert gas is nitrogen or carbon dioxide.

* * * * *